United States Patent
Yamamoto (10) Patent No.: US 10,792,735 B2
(45) Date of Patent: Oct. 6, 2020

(54) MACHINE TOOL

(71) Applicant: DMG MORI CO., LTD., Yamatokoriyama-shi (JP)

(72) Inventor: Koji Yamamoto, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 0 days.

(21) Appl. No.: 16/365,838

(22) Filed: Mar. 27, 2019

(65) Prior Publication Data
US 2019/0308251 A1    Oct. 10, 2019

(30) Foreign Application Priority Data
Apr. 4, 2018   (JP) .................. 2018-072333

(51) Int. Cl.
| | |
|---|---|
| *B23Q 11/00* | (2006.01) |
| *B23Q 11/02* | (2006.01) |
| *B23B 31/06* | (2006.01) |
| *B23B 31/00* | (2006.01) |
| *B23Q 3/155* | (2006.01) |

(52) U.S. Cl.
CPC .......... *B23B 31/006* (2013.01); *B23Q 3/1554* (2013.01); *B23Q 11/005* (2013.01); *B23B 2231/04* (2013.01); *B23Q 2003/155418* (2016.11); *B23Q 2003/155428* (2016.11); *B23Q 2003/155439* (2016.11)

(58) Field of Classification Search
CPC ... B23B 2231/04; B23B 31/006; B23B 31/10; B23B 31/117; B23B 49/00; B23Q 11/005; B23Q 2003/155418; B23Q 2003/155428; B23Q 2003/155439; B23Q 3/1554
See application file for complete search history.

(56) References Cited

U.S. PATENT DOCUMENTS

| | | | | |
|---|---|---|---|---|
| 4,480,366 | A | * | 11/1984 | Takahashi ............... B23B 29/04 29/26 A |
| 4,504,824 | A | * | 3/1985 | Mello ................... B23B 49/001 340/680 |

(Continued)

FOREIGN PATENT DOCUMENTS

| | | |
|---|---|---|
| JP | 5-29656 U | 4/1993 |
| JP | 7-285046 | 10/1995 |

(Continued)

*Primary Examiner* — Nicole N Ramos
(74) *Attorney, Agent, or Firm* — Oblon, McClelland, Maier & Neustadt, L.L.P.

(57) ABSTRACT

A machine tool includes a spindle including a tool insertion portion having a shape of an opening into which a shank of a tool is inserted and configured to attach the tool thereto, a tool change unit configured to change the tool attached to the spindle while gripping the tool, an air supply unit configured to supply air to a gap between the tool insertion portion and the shank of the tool when the tool change unit changes the tool, and a controller configured to control driving of at least any one of the spindle and the tool change unit to allow the tool and the tool insertion portion to reciprocate relative to each other in a predetermined direction with the shank of the tool inserted into the tool insertion portion and with a gap provided between the tool insertion portion and the shank of the tool.

5 Claims, 7 Drawing Sheets

(56) References Cited

U.S. PATENT DOCUMENTS

| | | | | |
|---|---|---|---|---|
| 5,002,442 | A * | 3/1991 | Rutschle | B23Q 1/0027 408/238 |
| 5,762,454 | A * | 6/1998 | Yamada | B23Q 17/006 408/6 |
| 6,059,702 | A * | 5/2000 | Winkler | B23Q 3/157 408/56 |
| 7,568,867 | B2 * | 8/2009 | Bryan | B23Q 5/06 137/56 |
| 9,162,335 | B2 * | 10/2015 | Dodds | B23Q 1/0036 |
| 2002/0045521 | A1 * | 4/2002 | Mochida | B23B 31/305 483/31 |
| 2004/0146368 | A1 * | 7/2004 | Konishi | B23Q 1/0009 409/131 |
| 2004/0176228 | A1 | 9/2004 | Kojima et al. | |
| 2012/0220437 | A1 * | 8/2012 | Hayashi | B23Q 3/15706 483/30 |
| 2014/0018219 | A1 * | 1/2014 | Dodds | B23Q 1/0036 483/19 |

FOREIGN PATENT DOCUMENTS

| | | | | |
|---|---|---|---|---|
| JP | 2004-268177 | | 9/2004 | |
| WO | WO-2009122763 | A1 * | 10/2009 | ........... B23Q 17/003 |

* cited by examiner

MACHINE TOOL

BACKGROUND OF THE INVENTION

Field of the Invention

The present invention relates to machine tools.

Description of the Background Art

For conventional machine tools, for example, Japanese Patent Laying-Open No. 07-285046 discloses a machining center including a spindle provided with a spindle tool attachment unit for detachably attaching a tool. In change of a tool (2-face restraint tool), the tool is stopped to provide a gap between a tapered surface and an end surface of the spindle tool attachment unit and a tapered surface and an end surface of the tool, and cleaning air is passed through the gap while the tool is stopped, thereby cleaning the tapered surface and the end surface of the tool.

Japanese Patent Laying-Open No. 2004-268177 also discloses a machine tool including a tool change mechanism. The machine tool disclosed in Japanese Patent Laying-Open No. 2004-268177 uses a drive motor included in the tool change mechanism to vibrate the tool, thereby removing chips adhering to a tapered portion of the tool.

SUMMARY OF THE INVENTION

Various techniques of removing chips adhering to a tool in automatic tool change are proposed as described above. Even when the techniques disclosed in Japanese Patent Laying-Open No. 07-285046 and Japanese Patent Laying-Open No. 2004-268177 are used, however, chips may not be sufficiently removed from a tool due to varying amounts and states of chips adhering to the tool.

The present invention therefore has an object to solve the above problem and provide a machine tool capable of efficiently removing chips adhering to a tool.

A machine tool according to the present invention includes a tool attachment unit, a tool change unit, an air supply unit, and a controller. The tool attachment unit has a tool insertion portion having a shape of an opening into which a shank of a tool is inserted. The tool attachment unit is configured to attach a tool thereto. The tool change unit changes the tool attached to the tool attachment unit while gripping the tool. The air supply unit is configured to supply air to a gap between the tool insertion portion and the shank of the tool when the tool change unit changes the tool. The controller is configured to control driving of at least any one of the tool attachment unit and the tool change unit to allow the tool and the tool insertion portion to reciprocate relative to each other in a predetermined direction with the shank of the tool inserted into the tool insertion portion and with a gap provided between the tool insertion portion and the shank of the tool.

The present invention can provide a machine tool capable of efficiently removing chips adhering to a tool.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described with reference to the drawings. It should be noted that the same or corresponding members are given the same reference characters.

Embodiment 1

Figure 1:
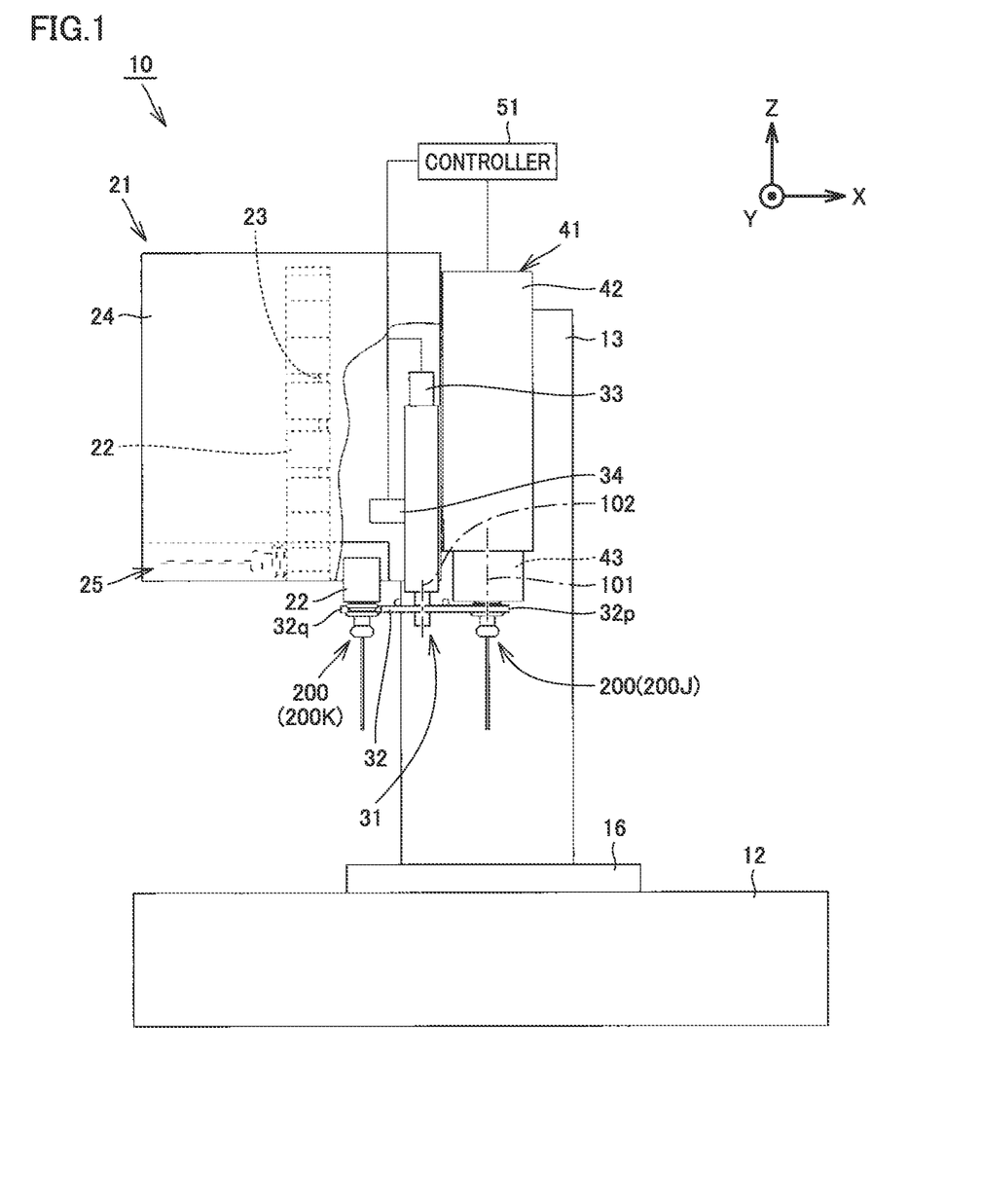
FIG. 1 is a front view of a machine tool in Embodiment 1 of the present invention.

FIG. 1 is a front view of a machine tool in Embodiment 1 of the present invention. With reference to FIG. 1, a machine tool 10 is a vertical machining center. Machine tool 10 includes a bed 12, a column 13, a spindle head 41, a table 16, a tool magazine 21, and a tool change unit 31.

Bed 12 is a base member for mounting column 13, spindle head 41, table 16, and the like, and is installed on an installation surface of, for example, a factory.

Column 13 is provided upright on bed 12. Spindle head 41 is attached to column 13. Spindle head 41 is provided to be slidable in a Z axis direction parallel to the vertical direction. A feed mechanism, a guide mechanism, a servo motor serving as a driving source, and the like for allowing spindle head 41 to slidably move in the Z axis direction are provided in column 13 and spindle head 41 as appropriate.

Spindle head 41 includes a spindle sleeve 42 and a spindle 43. Spindle sleeve 42 has a tube shape extending in the Z axis direction. Spindle 43 is rotatably supported by spindle sleeve 42. Spindle 43 is motor-driven to rotate about a central axis 101 parallel to the Z axis. A tool 200 for machining a workpiece that is a machining target is attached to spindle 43. Spindle 43 is provided as a tool attachment unit configured to attach tool 200 thereto.

Table 16 is a device for fixing a workpiece. Table 16 is attached to bed 12 via a saddle (not shown).

The saddle is horizontally parallel to bed 12 and is provided to be slidably movable in a Y axis direction (anterior-posterior direction) perpendicular to the Z axis direction. Table 16 is horizontally parallel to the saddle and is provided to be slidably movable in an X axis direction (left-right direction) orthogonal to the Z axis and the Y axis. A feed mechanism, a guide mechanism, a servo motor serving as a drive source, and the like for allowing the saddle to slidably move in the Y axis direction and table 16 to slidably move in the X axis direction are provided in bed 12, the saddle, and table 16 as appropriate.

Tool magazine 21 is a device that houses a plurality of tools for sequentially supplying tools to a machining area in accordance with a purpose of machining. Tool magazine 21 houses tools 200 such as a drill, an end mill, and a milling cutter that are attached to spindle 43.

Tool magazine 21 includes a plurality of tool pots 22, a support plate 23, and a cover body 24.

Each of tool pots 22 detachably holds tool 200. Support plate 23 supports tool pots 22 at regular intervals along an annular transport path. Cover body 24 is provided to surround tool pots 22 and support plate 23. An opening 25 is provided in cover body 24. Rotationally driving support plate 23 transfers tool pots 22 circumferentially.

Tool change unit 31 is an automatic tool changer (ATC). Tool change unit 31 changes a tool 200 attached to spindle 43 while grasping tool 200. Tool change unit 31 changes tool 200 between spindle 43 and tool magazine 21 (tool pot 22).

Tool change unit 31 includes an ATC main arm 32, an advancing and retreating servo motor 33, and a rotating servo motor 34.

Advancing and retreating servo motor 33 and rotating servo motor 34 are devices for driving ATC main arm 32. The output shaft of advancing and retreating servo motor 33 is connected to ATC main arm 32 via a motion conversion mechanism (not shown) that converts rotational motion into linear motion. The power from advancing and retreating servo motor 33 is transmitted to ATC main arm 32, causing ATC main arm 32 to slidably move (ascend and descend) along central axis 102 parallel to the Z axis. The output shaft of rotating servo motor 34 is connected to ATC main arm 32 via a power transmission mechanism (not shown). The power from rotating servo motor 34 is transmitted to ATC main arm 32, causing ATC main arm 32 to rotate about central axis 102.

ATC MAIN ARM 32 includes a gripper 32p and a gripper 32q as its components. Gripper 32p and gripper 32q are provided symmetrically with respect to central axis 102. ATC MAIN ARM 32 has an arm-like shape extending between gripper 32p and gripper 32q. Each of gripper 32p and gripper 32q is configured to grip tool 200. ATC MAIN ARM 32 is of a double-arm type capable of simultaneously gripping two tools 200.

In automatic tool change, ATC main arm 32 descends, causing tools 200 gripped by ATC main arm 32 to be pulled out of spindle 43 and tool pot 22. ATC MAIN ARM 32 turns 180°, causing the position of tool 200 gripped by gripper 32p of ATC main arm 32 to be replaced by the position of tool 200 gripped by gripper 32q of ATC main arm 32. ATC MAIN ARM 32 ascends, causing tools 200 gripped by ATC main arm 32 to be inserted into spindle 43 and tool pot 22.

Figure 2:
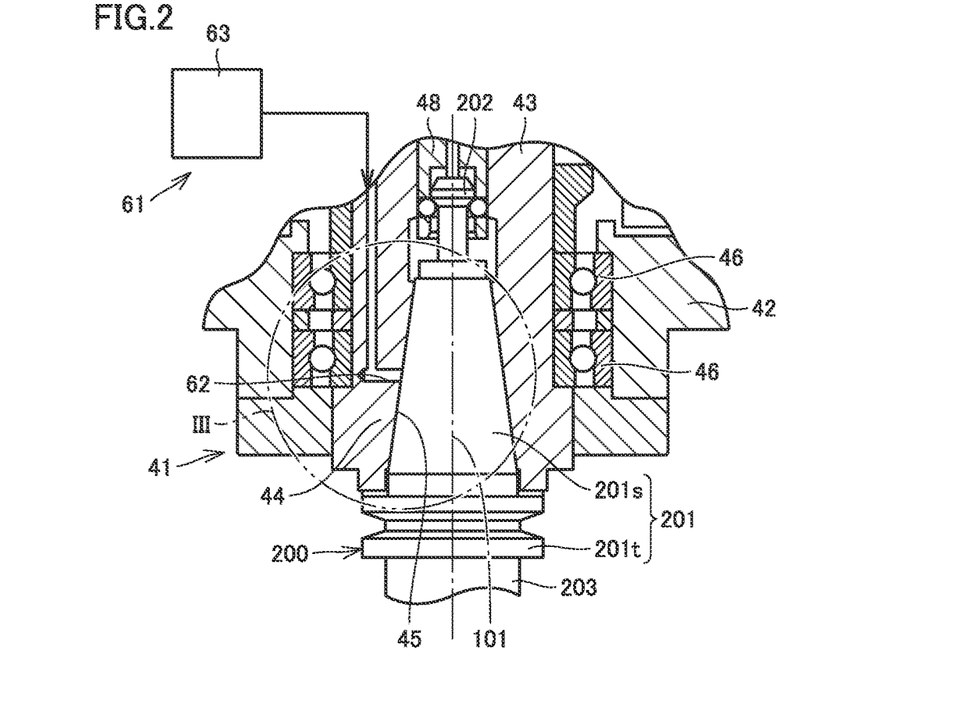
FIG. 2 is a sectional view showing a spindle end surface side of a spindle head of FIG. 1.

FIG. 2 is a sectional view showing the spindle end surface side of the spindle head in FIG. 1. With reference to FIGS. 1 and 2, spindle 43 is rotatably supported by spindle sleeve 42 through a plurality of bearings 46. With reference to FIG. 2, tool 200 is attached to spindle 43 while being clamped.

Spindle 43 includes a tool insertion portion 44. Tool insertion portion 44 has a shape of an opening into which a shank 201 (shank tapered portion 201s) of tool 200, which will be described below, is inserted. Tool insertion portion 44 has an opening surface which is open within the machining area and has a tubular opening shape extending from the opening surface along the axis of central axis 101. Tool insertion portion 44 is open downward.

Tool insertion portion 44 has a restraining surface 45. Restraining surface 45 is formed of a cylindrical inner circumferential surface extending about central axis 101 along the axis of central axis 101. Restraining surface 45 has a tapered shape having a diameter changing along the axis of central axis 101.

Spindle 43 further includes a tool clamping device 48. Tool clamping device 48 is configured to allow spindle 43 to clamp tool 200. Causing tool clamping device 48 to perform a clamping operation clamps tool 200 by spindle 43. Causing tool clamping device 48 to perform an unclamping operation unclamps tool 200 from spindle 43.

As one example, tool clamping device 48 is used that includes a collet capable of grasping tool 200, a drawbar that moves back and forth along the axis of central axis 101 to open and close the collet, a disc spring fitted into the drawbar, and a hydraulic mechanism that exerts an oil pressure on the drawbar. In this case, a clamping force for clamping tool 200 is obtained by the spring force of the disc spring, and an unclamping force for unclamping tool 200 is obtained by the oil pressure generated in the hydraulic mechanism.

Tool 200 includes shank 201, a pull stud 202, and a blade 203. Shank 201 is formed of a shank tapered portion 201s and a shank flanged portion 201t.

Shank tapered portion 201s has a tapered shape with a diameter changing along the axis of central axis 101. Shank tapered portion 201s is brought into surface contact with restraining surface 45 of tool insertion portion 44 when tool 200 is clamped. This brings tool 200 to surface restraint with spindle 43. Shank flanged portion 201t has a shape extending from one end of shank tapered portion 201s in the axial direction of central axis 101 like a collar. Shank flanged portion 201t is gripped by gripper 32p and gripper 32q of ATC main arm 32 in automatic tool change of tool 200.

Pull stud 202 is connected to the other end of shank tapered portion 201s in the axial direction of central axis 101. Pull stud 202 is pulled into spindle 43 along the axis of central axis 101 by tool clamping device 48 (collet) when tool 200 is clamped.

Machine tool 10 is a numerically control (NC) machine tool in which various operations for machining a workpiece are automated through numerical control by a computer.

Machine tool 10 further includes a controller 51. Controller 51 is a control board installed in machine tool 10 for controlling the various operations in machine tool 10. Controller 51 controls, for example, sliding movements of various structures in three orthogonal axes (X axis, Y axis, Z axis), operations of tool magazine 21 and tool change unit 31, and an air purge operation by an air supply unit 61, which will be described below.

Figure 3:
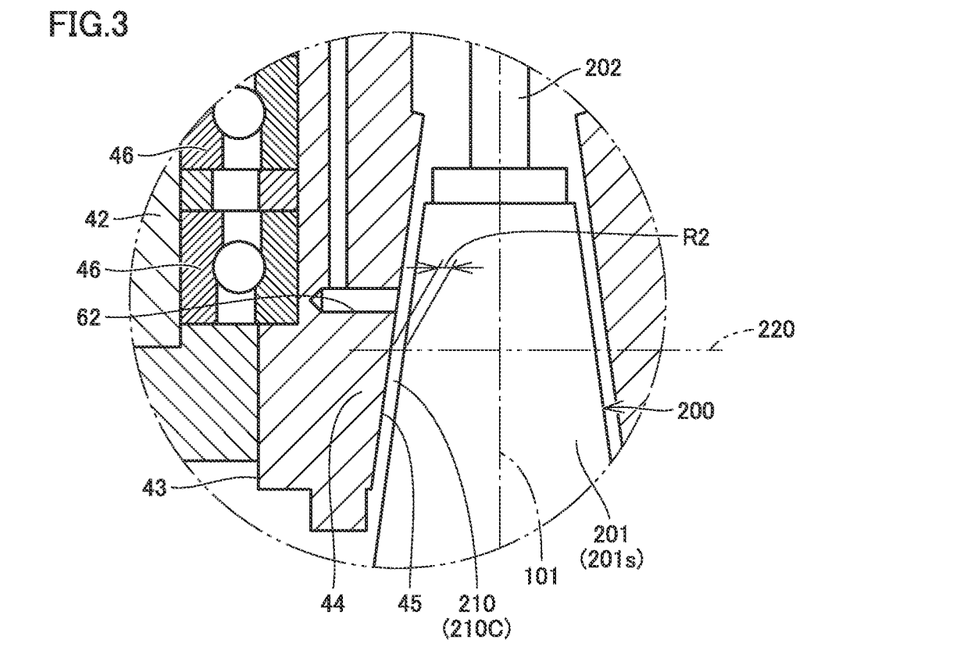
FIG. 3 is a sectional view showing an air purge step for a tool in automatic tool change.
Figure 4:
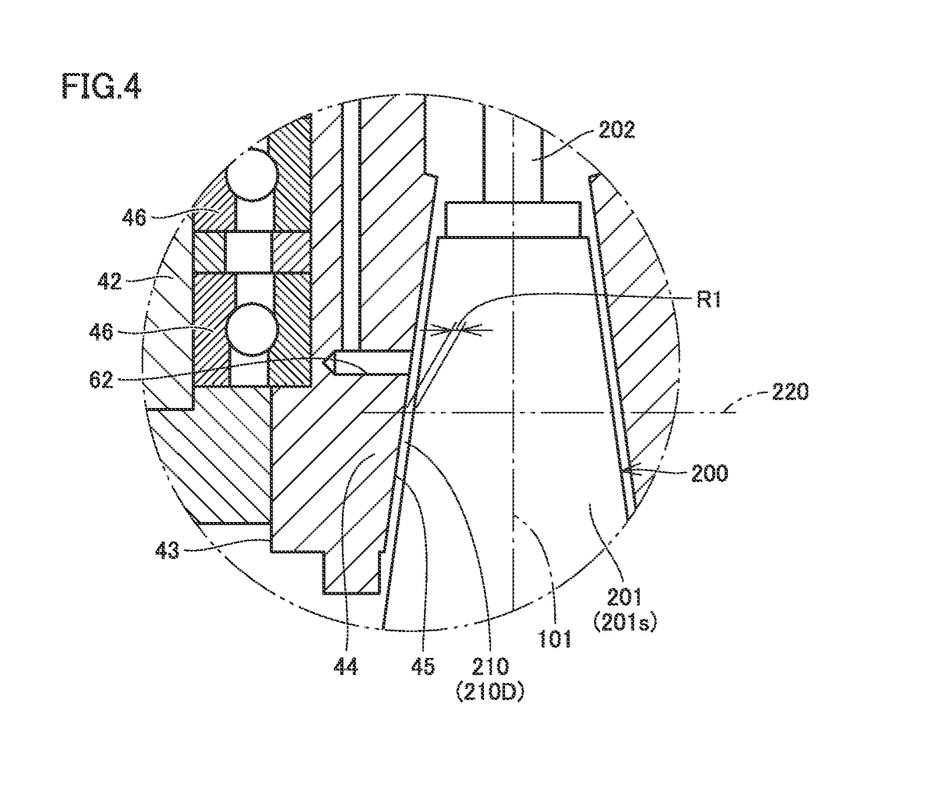
FIG. 4 is another sectional view showing the air purge step for a tool in automatic tool change.

FIGS. 3 and 4 are sectional views showing an air purge step for a tool in automatic tool change. FIGS. 3 and 4 show an enlarged range surrounded by a chain double-dashed line III in FIG. 2.

With reference to FIGS. 1 and 4, machine tool 10 further includes air supply unit 61. Air supply unit 61 is configured to supply air to a gap 210 between tool insertion portion 44 of spindle 43 and shank 201 of tool 200 in automatic tool change.

Air supply unit 61 includes an air compressor 63, an air circulation hole 62, and a valve (not shown). Air circulation hole 62 is provided in spindle 43. Air circulation hole 62 is open on restraining surface 45. Air circulation hole 62 may be open at a plurality of spots of restraining surface 45. Air compressor 63 is configured to supply compressed air. Air circulation hole 62 is supplied with the air from air compressor 63. The valve is provided on a path of the air supplied from air compressor 63.

When the valve is opened, air is injected from air circulation hole 62 toward gap 210. The air passes through gap 210 toward the spindle end surface, thereby removing chips adhering to tool 200. When the valve is closed, the ejection of the air from air circulation hole 62 toward gap 210 is stopped.

Figure 5:
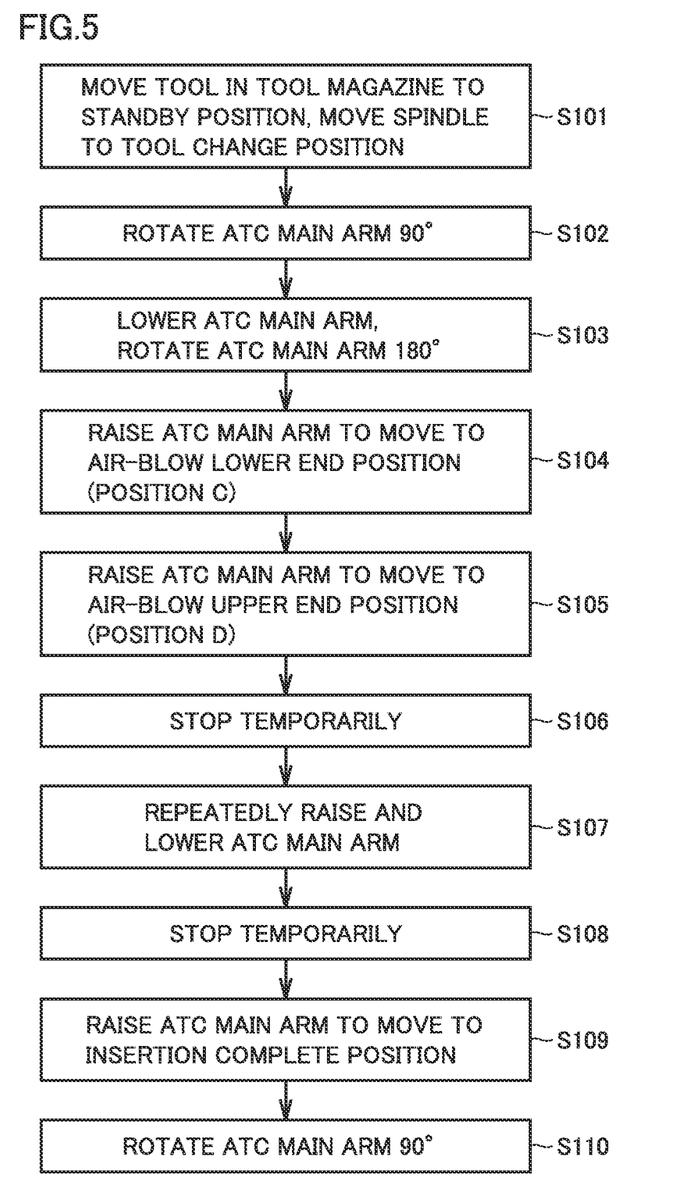
FIG. 5 is a flowchart showing a flow of steps of automatic tool change and air purge.
Figure 6:
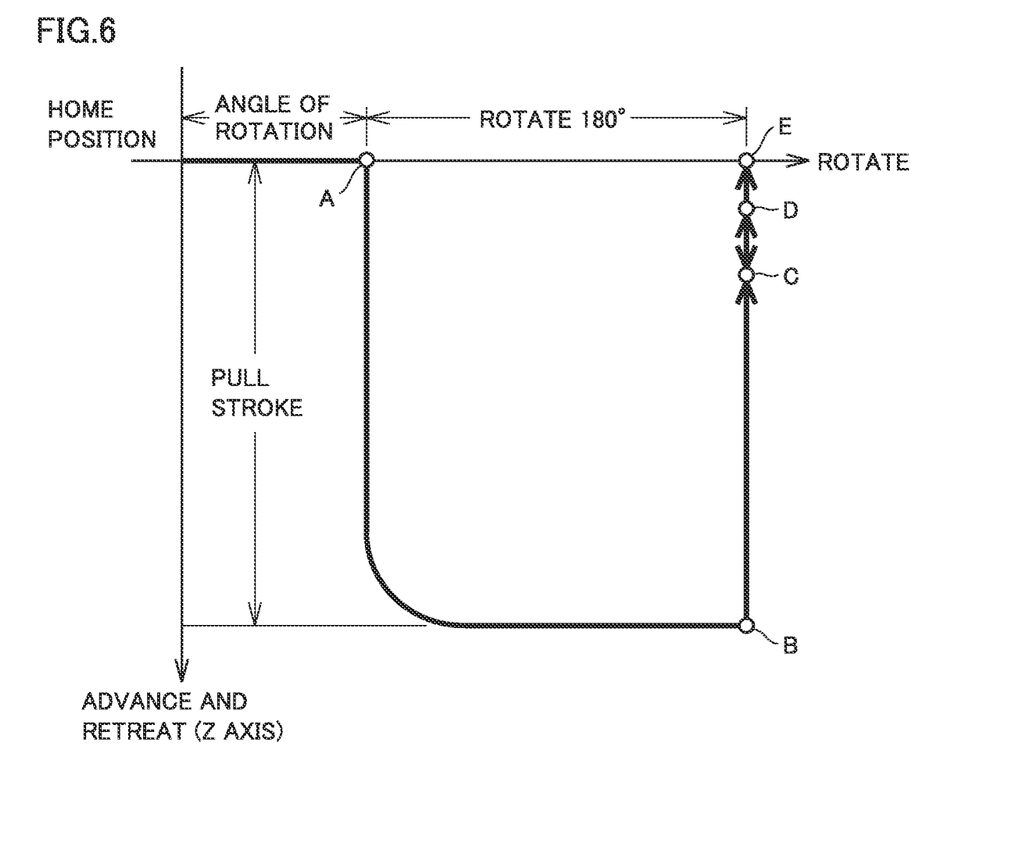
FIG. 6 is a graph showing movements (advancing and retreating motions, turning motion) of an ATC main arm in automatic tool change.
Figure 7:
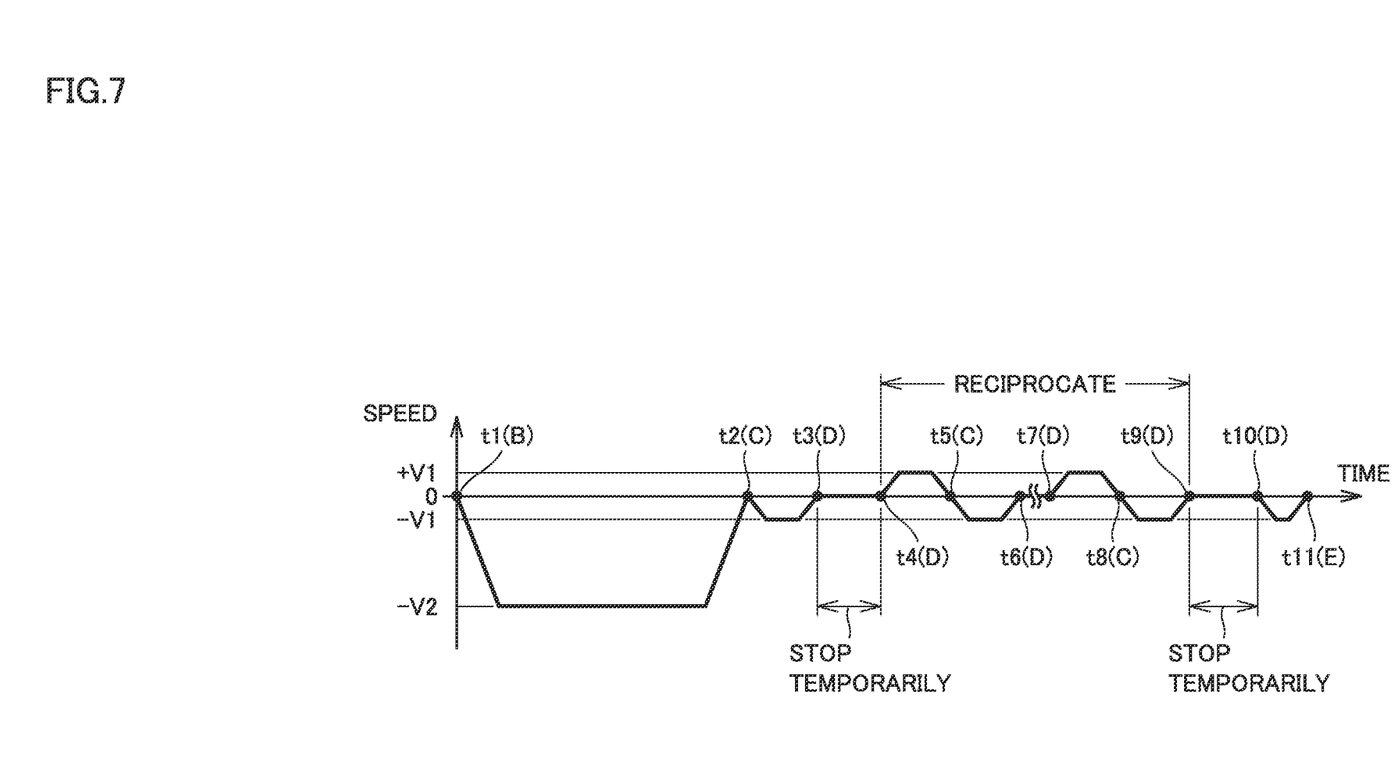
FIG. 7 is a graph showing changes in the speed of a tool in automatic tool change.

FIG. 5 is a flowchart showing a flow of steps of automatic tool change and air purge. FIG. 6 is a graph showing movements (advancing and retreating motions, turning motion) of an ATC main arm in automatic tool change. FIG. 7 is a graph showing changes in the speed of a tool in automatic tool change. In FIG. 7, the speed of tool 200 during ascent is indicated by a minus sign, and the speed of tool 200 during descent is indicated by a plus sign.

With reference to FIGS. 1 to 7, description will be given of an automatic tool change step for tool 200 attached to spindle 43 and an air purge step for tool 200 which is performed by spindle 43 along with the automatic tool change.

At step S101 in FIG. 5, first, tool 200 in tool magazine 21 is moved to a standby position, and also, spindle 43 is moved to a tool change position.

In tool magazine 21, a tool pot 22 to which a tool 200K to be used in machining of a next workpiece is attached is transferred to a position (indexing position) of opening 25 which is provided in cover body 24. Tool pot 22 is rotated 90° by a turning mechanism (not shown) to move from the indexing position to the standby position. While tool pot 22 is located at the standby position, the central axis of tool 200K held by tool pot 22 is a direction (Z axis direction) parallel to central axis 101 and central axis 102.

Spindle 43 with a tool 200J attached thereto is moved to the tool change position adjacent to the standby position of tool pot 22 after machining of the workpiece using tool 200J is complete.

At step S102 in FIG. 5, then, with a shutter (not shown) open, which separates an area within the machining area from an area outside the machining area, ATC main arm 32 is rotated 90° from a home position (a position at which ATC main arm 32 extends along the Y axis like an arm).

At this time, gripper 32p grips tool 200J attached to spindle 43, and gripper 32q grips tool 200K held by tool pot 22 located at the standby position (the state shown in FIG. 1). Clamping of tool 200J in spindle 43 is released at a timing at which tool 200J is gripped by gripper 32p.

At step S103 in FIG. 5, then, ATC main arm 32 is lowered, and also, ATC main arm 32 is rotated 180° (corresponding to position A→position B in FIG. 6).

Consequently, tool 200J is pulled out of spindle 43, and tool 200K is pulled out of tool pot 22. Simultaneously, tool 200J is moved to a position at which tool 200J faces tool pot 22 in the Z axis direction, and tool 200K is moved to a position at which tool 200K faces spindle 43 in the Z axis direction.

At step S104 in FIG. 5, then, ATC main arm 32 is raised to move to the air-blow lower end position (corresponding to position B→position C in FIG. 6, time t1→time t2 in FIG. 7).

At this time, ATC main arm 32 is moved at a speed V2. FIG. 3 shows tool 200 when ATC main arm 32 has been moved to the air-blow lower end position (position C in FIG. 6). Shank tapered portion 201s of tool 200 is inserted into tool insertion portion 44. A gap 210 (210C) is provided between shank tapered portion 201s and restraining surface 45 of tool insertion portion 44. Air is injected to gap 210 (210C) through air circulation hole 62.

At step S105 in FIG. 5, then, ATC main arm 32 is raised to move to the air-blow upper end position (corresponding to position C position D in FIG. 6, time t2→time t3 in FIG. 7).

At this time, ATC main arm 32 is moved at a speed V1, which is lower than speed V2 at the former step. FIG. 4 shows tool 200 when ATC main arm 32 has been moved to the air-blow upper end position (position D in FIG. 6). A gap 210 (210D) is provided between shank tapered portion 201s and restraining surface 45 of tool insertion portion 44.

Gap 210 has a ring shape formed about central axis 101 when gap 210 is cut in a plane orthogonal to central axis 101. Gap 210 has a ring shape with a constant ring width in the radial direction of central axis 101.

As shown in FIGS. 3 and 4, the size of gap 210D is smaller than the size of gap 210C. The area of gap 210D obtained when gap 210D is cut in an appropriate plane 220 orthogonal to central axis 101 is smaller than the area of gap 210C obtained when gap 210C is cut in the same plane 220. On plane 220, a length (ring width) R1 of gap 210D in the radial direction of central axis 101 is smaller than a length (ring width) R2 of gap 210C in the radial direction of central axis 101.

At step S106 in FIG. 5, then, ATC main arm 32 is stopped at the air-blow upper end position for a certain period of time (corresponding to time t3→time t4 in FIG. 7).

At step S107 in FIG. 5, then, ATC main arm 32 is repeatedly raised and lowered between the air-blow upper end position and the air-blow lower end position (corresponding to position D→position C→position D→position C→ . . . in FIG. 6, time t4 to time t9 in FIG. 7).

At this time, ATC main arm 32 is repeatedly raised and lowered at speed V1. With shank 201 of tool 200K inserted into tool insertion portion 44 and with gap 210 provided between tool insertion portion 44 and shank 201 of tool 200K, tool 200K reciprocates along the Z axis relative to tool insertion portion 44.

At the above step, the distance between the air-blow upper end position (position D) and the air-blow lower end position (position C) and the cycle in which tool 200K is reciprocated are preferably set to achieve a phenomenon in which tool 200K slightly vibrates in the Z axis direction.

The distance between the air-blow upper end position (position D) and the air-blow lower end position (position C) is not particularly limited, which may be in the range of 0.5 mm or more and 5 mm or less or in the range of 1 mm or more and 3 mm or less.

At step S108 in FIG. 5, then, ATC main arm 32 is stopped at the air-blow upper end position for a certain period of time (corresponding to time t9→time t10 in FIG. 7).

At step S109 in FIG. 5, then, ATC main arm 32 is raised to move to an insertion complete position (corresponding to position D→position E in FIG. 6, time t10→time t11 in FIG. 7). At this time, ATC main arm 32 is raised at speed V1. Tool 200K is clamped in spindle 43.

At step S110 in FIG. 5, then, ATC main arm 32 is rotated 90° to return to its home position. Through the above steps, automatic tool change of tool 200 attached to spindle 43 is complete.

In machine tool 10 in the present embodiment, controller 51 controls driving of tool change unit 31 such that tool 200 reciprocates relative to tool insertion portion 44 in a predetermined direction with shank 201 of tool 200 inserted into tool insertion portion 44 and with gap 210 provided between tool insertion portion 44 and shank 201 of tool 200.

With such a configuration, the speed of an airflow in gap 210 changes momentarily due to repetitive increase and decrease in the size of gap 210 which are caused by the reciprocating motion of tool 200. This causes turbulence in an airflow in gap 210, thereby efficiently removing chips adhering to tool 200.

The predetermined direction in which tool 200 reciprocates relative to tool insertion portion 44 is the direction (Z axis direction) of insertion of shank 201 of tool 200 into tool insertion portion 44.

With such a configuration, a length (ring width) of gap 210 in the radial direction of central axis 101 is uniform circumferentially about central axis 101, which makes it difficult for restraining surface 45 of tool insertion portion 44 and shank tapered portion 201s of tool 200 to interfere with each other. Also, an effect of efficiently removing chips adhering to tool 200 can be uniformly achieved circumferentially about central axis 101.

Controller 51 also controls driving of tool change unit 31 to perform the step (corresponding to S105) of inserting shank 201 of tool 200 into tool insertion portion 44 in one direction and stopping the insertion of shank 201 of tool 200 into tool insertion portion 44 at a first position (position D in FIG. 6) at which gap 210 is generated between tool insertion portion 44 and shank 201 of tool 200 and the step (corresponding to S107) of reciprocating tool 200 relative to tool insertion portion 44 between the first position (position D in FIG. 6) and a second position (position C in FIG. 6) opposite to the direction of insertion of shank 201 of tool 200 as viewed from the first position (position D in FIG. 6).

With such a configuration, after tool insertion portion 44 is stopped at the first position at which gap 210 is generated at step S105, at step S107, tool 200 is reciprocated between the first position and the second position located in the direction in which gap 210 increases as viewed from the first position. This makes it further difficult for restraining surface 45 of tool insertion portion 44 and shank tapered portion 201s of tool 200 to interfere with each other.

At step S107, spindle 43 (spindle head 41) may be raised and lowered when tool 200 is reciprocated relative to tool insertion portion 44. Tool 200 and tool insertion portion 44 may be reciprocated relative to each other in an up-down direction by simultaneously raising and lowering ATC main arm 32 and raising and lowering spindle 43 (spindle head 41).

A machine tool to which the present invention is applied is not limited to a vertical machining center and may be a horizontal machining center or a multitasking machine having a turning function and a milling function.

Embodiment 2

The present embodiment will describe various modifications of the manner of reciprocating tool 200 and tool insertion portion 44 relative to each other at step S107 in FIG. 5.

Figure 8:
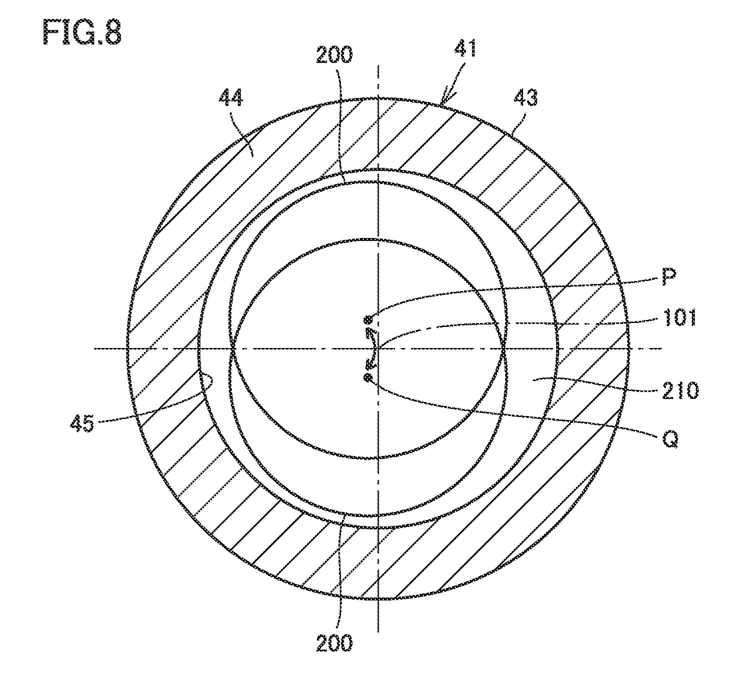
FIG. 8 is a sectional view showing a first modification of a manner of reciprocating a tool and a tool insertion portion relative to each other.

FIG. 8 is a sectional view showing a first modification of the manner of reciprocating a tool and a tool insertion portion relative to each other. FIG. 8 schematically shows a cross-section of spindle head 41 cut in a plane orthogonal to central axis 101.

With reference to FIGS. 1 and 8, at step S107 in FIG. 5, ATC main arm 32 is rotated alternately in the forward direction and reverse direction about central axis 102. This causes tool 200 to reciprocate relative to tool insertion portion 44 circumferentially about central axis 102 between a tool center position P and a tool center position Q.

Figure 9:
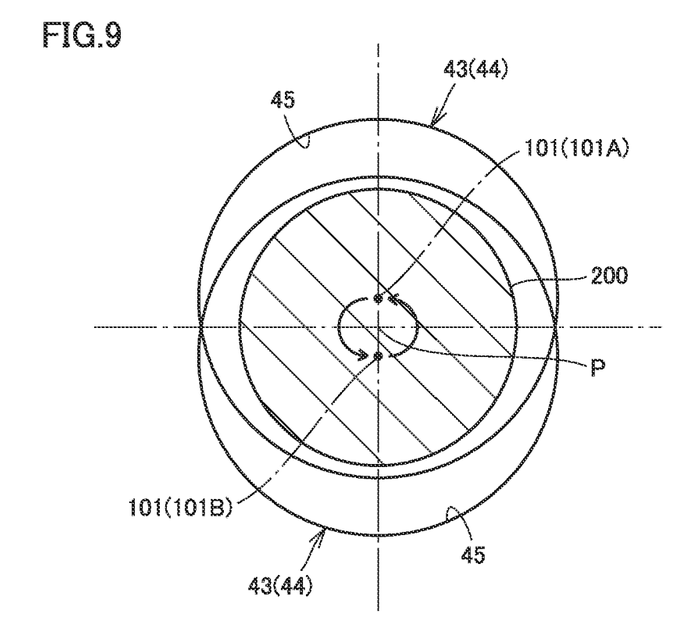
FIG. 9 is a sectional view showing a second modification of the manner of reciprocating a tool and a tool insertion portion relative to each other.

FIG. 9 is a sectional view showing a second modification of the manner of reciprocating a tool and a tool insertion portion relative to each other. FIG. 9 schematically shows a cross-section of spindle head 41 cut in a plane orthogonal to central axis 101. In the present modification, spindle head 41 is configured to be movable in a horizontal plane (X-axis-Y-axis plane).

With reference to FIGS. 1 and 9, at step S107 in FIG. 5, spindle 43 (spindle head 41) is moved to describe a circumference about tool center P of tool 200 in the horizontal plane (X-axis-Y-axis plane). This causes tool insertion portion 44 to reciprocate relative to tool 200 circumferentially about tool center P between a spindle center position 101A and a spindle center position 101B.

In the modifications shown in FIGS. 8 and 9, the predetermined direction in which tool 200 and tool insertion portion 44 reciprocate relative to each other is a direction parallel to the plane (X-axis-Y-axis plane) orthogonal to the direction of insertion of shank 201 into tool insertion portion 44.

The machine tool according to Embodiment 2 of the present invention configured as described above can achieve effects similar to those described in Embodiment 1.

The configuration of the present invention and the functions and effects achieved by the present invention will be summarized below.

A machine tool according to the present invention includes a tool attachment unit, a tool change unit, an air supply unit, and a controller. The tool attachment unit includes a tool insertion portion having a shape of an opening into which a shank of a tool is inserted. The tool attachment unit is configured to attach a tool thereto. The tool change unit changes the tool attached to the tool attachment unit while gripping the tool. The air supply unit is configured to supply air to a gap between the tool insertion portion and the shank of the tool when the tool change unit changes the tool. The controller is configured to control driving of at least any one of the tool attachment unit and the tool change unit to allow the tool and the tool insertion portion to reciprocate relative to each other in a predetermined direction with the shank of the tool inserted into the tool insertion portion and with a gap provided between the tool insertion portion and the shank of the tool.

The machine tool configured as described above reciprocates the tool and the tool insertion portion relative to each other in the predetermined direction, thereby causing turbulence in an airflow flowing through a gap between the tool insertion portion and the shank of the tool. This efficiently removes chips adhering to the tool.

Preferably, the shank of the tool is inserted into the tool insertion portion from one direction. The predetermined direction is a direction of insertion of the shank of the tool.

The machine tool configured as described above makes it difficult for the tool attachment unit and the shank of the tool to interfere with each other when the tool and the tool insertion portion are reciprocated relative to each other in the predetermined direction.

Preferably, the controller controls driving of at least any one of the tool attachment unit and the tool change unit to perform the steps of inserting the shank of the tool into the tool insertion portion in one direction and stopping the insertion of the shank of the tool into the tool insertion portion at a first position at which a gap is generated between the tool insertion portion and the shank of the tool, and reciprocating the tool and the tool insertion portion relative to each other between the first position and a second position opposite to the direction of insertion of the shank of the tool as viewed from the first position.

The machine tool configured as described above makes it further difficult for the tool attachment unit and the shank of the tool to interfere with each other when the tool and the tool insertion portion are reciprocated relative to each other in the predetermined direction.

Preferably, the shank of the tool is inserted into the tool insertion portion from one direction. The predetermined direction is a direction parallel to a plane orthogonal to the direction of insertion of the shank of the tool.

The machine tool configured as described above can change the size of the gap between the tool insertion portion and the shank of the tool in the plane orthogonal to the direction of insertion of the shank of the tool. This causes turbulence in an airflow flowing through the gap.

The present invention is applied to a machine tool including an air purge mechanism for a tool during automatic tool change.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A machine tool comprising:
    a tool attachment unit including a tool insertion portion having a shape of an opening into which a shank of a tool is inserted, the tool attachment unit being configured to attach a tool thereto;
    a tool change unit configured to change the tool attached to the tool attachment unit while gripping the tool;
    an air supply unit configured to supply air to a gap between the tool insertion portion and the shank of the tool when the tool change unit changes the tool; and
    a controller configured to control driving of at least any one of the tool attachment unit and the tool change unit to reciprocate the tool and the tool insertion portion relative to each other in a predetermined direction repeatedly from a first position to a second position and then back to the first position prior to completing insertion of the tool into the tool insertion portion, in the first position and the second position the shank of the tool is not completely inserted into the tool insertion portion such that the gap is provided between the tool insertion portion and the shank of the tool.

2. The machine tool according to claim 1, wherein
    the shank of the tool is inserted into the tool insertion portion from one direction, and
    the predetermined direction is a direction of insertion of the shank of the tool.

3. The machine tool according to claim 2, wherein the controller controls at least any one of the tool attachment unit and the tool change unit to perform the steps of
    inserting the shank of the tool into the tool insertion portion in one direction and stopping the insertion of the shank of the tool into the tool insertion portion at the first position at which the gap is generated between the tool insertion portion and the shank of the tool, and
    reciprocating the tool and the tool insertion portion relative to each other between the first position and the second position opposite to the direction of insertion of the shank of the tool as viewed from the first position.

4. The machine tool according to claim 1, wherein
    the shank of the tool is inserted into the tool insertion portion from one direction, and
    the predetermined direction is a direction parallel to a plane orthogonal to a direction of insertion of the shank of the tool.

5. The machine tool according to claim 1, wherein the gap in the first position is smaller than the gap in the second position.

* * * * *